US006636275B1

(12) United States Patent
Wilson

(10) Patent No.: US 6,636,275 B1
(45) Date of Patent: Oct. 21, 2003

(54) PROJECTION SYSTEM FOR HIGH DEFINITION DIGITAL IMAGES

(75) Inventor: Dennis L. Wilson, Palo Alto, CA (US)

(73) Assignee: Lockheed Martin Corporation, Bethesda, MD (US)

( * ) Notice: Subject to any disclaimer, the term of this patent is extended or adjusted under 35 U.S.C. 154(b) by 429 days.

(21) Appl. No.: 09/703,019

(22) Filed: Oct. 31, 2000

(51) Int. Cl.[7] .................................................. H04N 5/74
(52) U.S. Cl. ...................................... 348/750; 348/756
(58) Field of Search ................................ 348/745, 776, 348/781, 782, 756, 757, 750; 359/204, 212, 216

(56) References Cited

U.S. PATENT DOCUMENTS

| | | | |
|---|---|---|---|
| 5,715,021 A | * 2/1998 | Gibeau et al. | 348/750 |
| 5,822,022 A | * 10/1998 | Deter et al. | 348/750 |
| 6,018,408 A | * 1/2000 | Hong | 359/201 |
| 6,154,259 A | * 11/2000 | Hargis et al. | 348/756 |
| 6,175,440 B1 | * 1/2001 | Conemac | 359/204 |

* cited by examiner

Primary Examiner—Victor R. Kostak
(74) Attorney, Agent, or Firm—Kenneth W. Float

(57) ABSTRACT

A high definition digital image projection system that uses modulated lasers to project high resolution images at frame rates that are used in the movie industry. An exemplary system employs digital-to-analog converters that convert digital signals derived from an image memory that correspond to predetermined colors that make up an image into analog signals for the respective color. A plurality of lasers 13a, have their light intensity outputs respectively modulated by the outputs of the digital-to-analog converters. A plurality of optical devices such as color sensitive half-silvered mirrors or sets of prisms having color-sensitive coatings on their respective faces, are used to produce a coaxial set of laser beams. First and second rotating mirrors are used to reflect the coaxial set of laser beams and generate an image for viewing. A mirror rotation synchronization circuit synchronizes rotation of the first and second rotating mirrors.

7 Claims, 1 Drawing Sheet

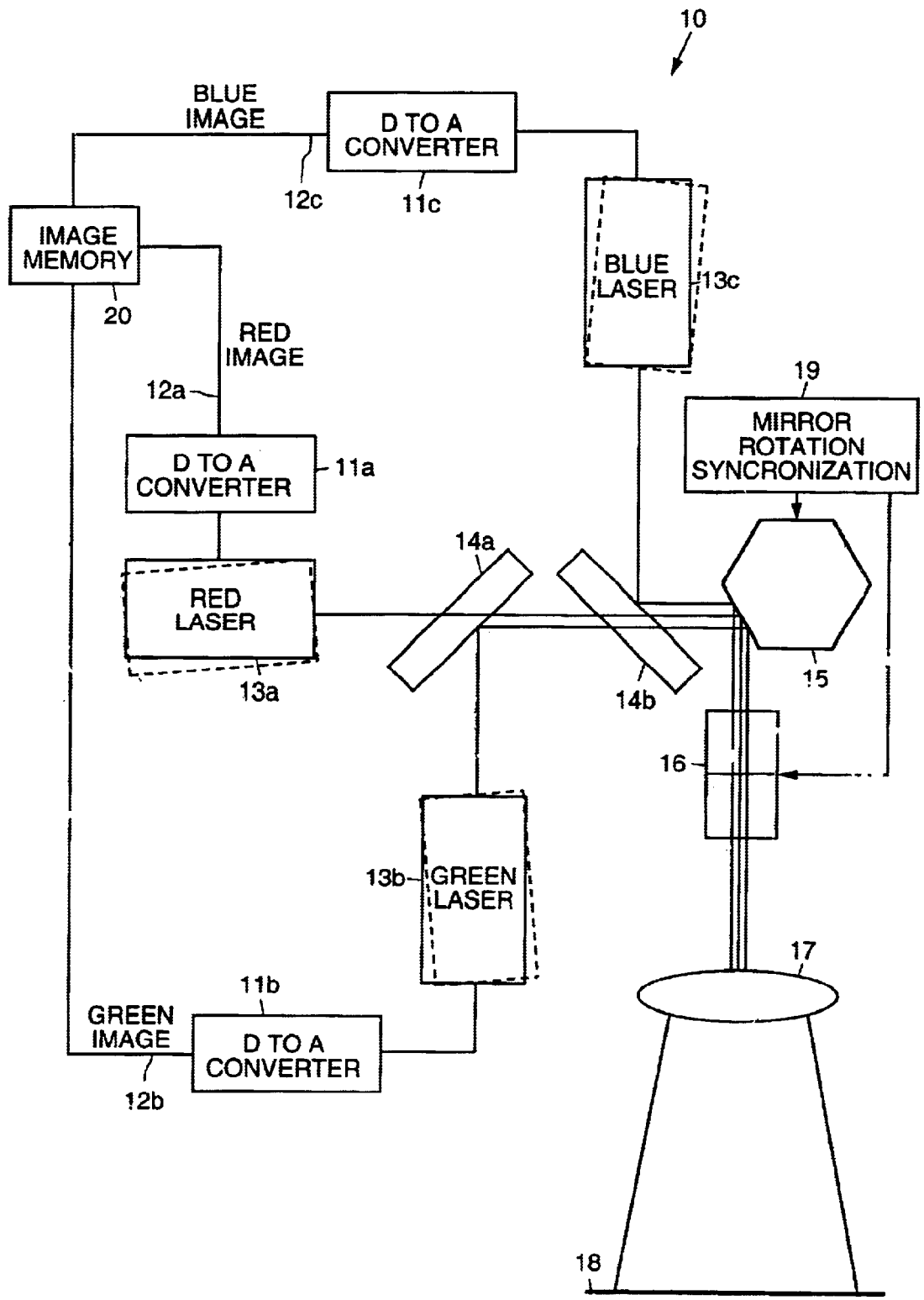

PROJECTION SYSTEM FOR HIGH DEFINITION DIGITAL IMAGES

BACKGROUND

The present invention relates generally to motion picture projectors, and more particularly, to high definition digital image projection systems for projecting high resolution images.

In the past, motion picture image projectors have typically been film projectors. Digital images also require a means for projection. Previous digital image projection solutions provide few pixels or low intensity projection such as are provided by TV screens.

The introduction of high resolution digital images with pixel sizes as large as 4000×3000 pixels requires new techniques for projection. Conventional techniques that are used in many applications include large screen TV tubes used in conference rooms for applications such as PICTURETEL video conferencing. Other techniques are used for the large screen displays used at sports complexes.

Another technique is used in a Texas Instrument array of movable mirrors. This array is a set of micro-mirrors that can be rotated. When a mirror is in one orientation, the light is reflected toward a lens system used for projection. When the mirror is in another orientation, the light is reflected away from the lens system. An array of such mirrors is used to build an image. The amount of time that the mirror is oriented toward the lens system establishes the amount of light of a particular color that is projected. These arrays are generally limited in size, since it is difficult to build large arrays of such mirrors.

It would therefore be desirable to have high definition digital image projection systems that improve over conventional systems. It is therefore an objective of the present invention to provide for high definition digital image projection systems for projecting high resolution images.

SUMMARY OF THE INVENTION

To accomplish the above and other objectives, the present invention comprises a digital projection system that uses modulated lasers and is capable of projecting high resolution images at frame rates that are used in the movie industry. Brightness and dynamic range are two of the requirements for the projection system that are most difficult and that are solved by the present invention.

The present projection system uses arrays of high intensity lasers to provide high intensity images for large screen projection of high resolution images. The present projection system provides higher intensity for large screen projection of high resolution images.

An exemplary high definition digital image projection system comprises an image memory having a plurality of outputs that are controllably and precisely delayed. A plurality of digital-to-analog converters are coupled to the image memory for converting digital signals output thereby that correspond to predetermined colors that make up an image into analog signals for the respective color. A plurality of lasers have their light intensity outputs modulated by the outputs of the respective digital-to-analog converters. A plurality of optical devices such as color sensitive half-silvered mirrors or sets of prisms having color-sensitive coatings on their respective faces, are used to produce a coaxial set of laser beams. First and second rotating mirrors are used to reflect the coaxial set of laser beams and generate an image for viewing. A mirror rotation synchronization circuit synchronizes rotation of the first and second rotating mirrors.

BRIEF DESCRIPTION OF THE DRAWINGS

The various features and advantages of the present invention may be more readily understood with reference to the following detailed description taken in conjunction with the accompanying drawings, wherein the sole drawing FIGURE illustrates an exemplary high definition digital image projection system in accordance with the principles of the present invention.

DETAILED DESCRIPTION

Referring now to the sole drawing FIGURE, it illustrates an exemplary high definition digital image projection system 10 in accordance with the principles of the present invention. Projection of high resolution images for the movie industry requires a new level of performance from the image projection system 10. The image rate must be 24 frames per second. The brightness must be equivalent to the brightness from a conventional movie projector. The resolution must be great enough that the displayed picture has the same quality as the film projector. The data rate that must be handled is 4000×3000×24=288 million pixels per second.

In the present high definition digital movie projection system, digital pixel values 12a, 12b, 12c for each color are routed from an image memory 20 having a plurality of outputs that are controllably and precisely delayed to a digital-to-analog converter 11a, 11b, 11c for that color. The outputs of the respective digital-to-analog converters 11a, 11b, 11c are used to control the light intensity output from a laser 13a, 13b, 13c of that color. Laser bandwidths are much higher than the 288 MHz bandwidth required to project the images. Digital-to-analog converters 11a, 11b, 11c are also readily available that can handle these bandwidths.

The modulated laser light from each of the lasers 13a, 13b, 13c is routed to a rotating mirror 15 through a series of optical devices 14a, 14b such as color sensitive half-silvered mirrors 14a, 14b. The half-silvered mirrors 14a, 14b are organized to reflect the light from the appropriate laser 13a, 13b, 13c and transmit other colors. A first mirror 14a is configured to transmit red light and reflect green light, for example. A second mirror 14b is configured to transmit red and green light and to reflect blue light, for example.

The mirrors 14a, 14b are carefully aligned so that the transmitted light beams are coaxial. This alignment guarantees that red, green, and blue images will be aligned when they reach a projection screen 18. Alternatively, the transmitted light beams need not be coaxial, but electronic means can be used to align the same pixels from separate lasers to appear at the same point in the projection.

A six sided rotating mirror 15, for example, is used to scan the light beams through a lens system 17 across the width of the projection screen 18. The six sided rotating mirror 15 first deflects the beam to one side of the screen 18 as the mirror 15 rotates. As the rotation continues, the beam is deflected across the screen 18 until the beam reaches the other side of the screen 18. At the end of the scan a new facet of the mirror 15 rotates into the beam and starts the beam on the original side of the screen 18.

A second rotating mirror 16 is used to deflect the beam in a vertical direction across the screen 18. The first rotating mirror 15 operates at a high rotation speed to provide side-to-side (horizontal) scanning, while the second rotating mirror 16 rotates more slowly at a frame rate that provides vertical scanning.

The mirrors 15, 16 are rotated synchronously with the image scan rate, centering the image side to side and vertically on the screen 18. A mirror rotation synchronization circuit 19 achieve the required synchronization.

Mirror rotation synchronization may be accomplished by using an auxiliary low intensity laser to one side of the projection lasers. The beam from the auxiliary synchronization laser will reflect from the rotating mirror into a light detector at a particular point in the rotation. The pulse from the light detector will establish a particular angle of rotation at the instant of detection. The motors driving the mirror may then be moved forward or back in the rotation to point the image at the correct location on the display screen.

High energy lasers 13a–13b suitable for projection have previously been available in red and in green colors. Only recently have blue color lasers 13c become available. The colors of the lasers 13a–13c must be adjusted to match the colors that were used in the recording. The recording response is carefully matched to the response characteristics of film, so that the digital pictures can match the established film color quality.

The high brightness of the high energy lasers 13a–13c is required, since each pixel is illuminated only one part in 12 million with one set of lasers 13a–13c. The brightness of the lasers 13a–13c must therefore be 12 million times the brightness of a projector that illuminates the whole image at once, such as a conventional projector using film.

The brightness of the lasers 13a–13c can be reduced by using more than one set of lasers 13a–13c to project the image. A second set of lasers 13a–13c (shown using dashed lines) disposed at an angle with respect to the first set of lasers 13a–13c can be used to project the same pixels ahead of the first set. The result is a doubling of the apparent intensity of the projected image. A small array of lasers 13a–13c for each of the red, green, and blue colors may be independently amplitude modulated to increase the intensity of the image by factors as much as several tens. A three by three array of lasers 13a–13c provides 9 times the intensity of a single laser 13a–13c.

The use of mirrors 14a, 14b to combine the separate colors into a single beam for the projector system 10 is shown in the drawing FIGURE. Another technique that provides the same function uses sets of prisms 14a, 14b with appropriate color-sensitive coatings on their respective faces.

Alignment of the array of lasers 13a–13c may be done electronically. At any particular alignment of the lasers 13a–13c and the rotating mirrors 15, 16, the beam from a particular laser 13a–13c will be pointed at a particular point on the projection screen 18. If the laser 13a–13c is modulated with the value for that pixel at that time, the images from the collection of lasers 13a–13c will be automatically aligned. Simple adjustment of the time delay to the laser 13a–13c achieved the required alignment.

The array of lasers 13a–13c may also be used to reduce the bandwidth required of any individual laser 13a–13c, reducing the complexity of the digital-to-analog converters 11a–11c and driving circuits for the lasers 13a–13c. The beams from individual lasers 13a–13c may be organized to traverse only a part of the image. Each individual laser 13a–13c need only provide for a bandwidth to illuminate the number of pixels that are illuminated.

For example, one laser 13a–13c may be used to traverse one quarter of the image starting from the top of the image. Only one quarter of the bandwidth is required to drive the laser 13a–13c. At the same time, the laser 13a–13c is illuminating each pixel for four times the time that it would if it were traversing the entire image, providing an increase in illumination that is one of the advantages of using the array of lasers 13a–13c. Four such lasers 13a–13c arranged in a vertical line will illuminate the entire image.

An array of lasers 13a–13c deployed in both vertical and horizontal rows can reduce the area illuminated by an individual laser 13a–13c in both the vertical and horizontal directions, further reducing the bandwidth and increasing the intensity of the projected image. As discussed above, the alignment of the rows and columns of the pixels from individual lasers 13a–13c may be done electronically by adjusting the delays to the individual lasers 13a–13c. Distortions at the boundaries of patches illuminated by individual lasers 13a–13c can be eliminated.

The laser projection system 10 may use an array of lasers 13a–13c of each of the colors (red, green, and blue). Each of the lasers 13a–13c is independently modulated in intensity to provide the intensity of the pixel toward which the beam from the laser 13a–13c is pointed by the rotating mirrors 15, 16 and the lens system 17. The intensity of projection comparable to the intensity of the film projection schemes used in movie theaters is achieved by using high powered lasers 13a–13c in arrays.

Thus, high definition digital image projection systems for projecting high resolution images have been disclosed. It is to be understood that the above-described embodiments are merely illustrative of some of the many specific embodiments that represent applications of the principles of the present invention. Clearly, numerous and other arrangements can be readily devised by those skilled in the art without departing from the scope of the invention.

What is claimed is:

1. A high definition digital image projection system for projecting high resolution images, comprising:

an image memory having a plurality of outputs that are controllably delayed;

a plurality of digital-to-analog converters for respectively converting digital signals derived from the image memory that correspond to predetermined colors that make up an image into analog signals for the respective color;

a plurality of lasers whose light intensity output are each respectively modulated by the outputs of the respective digital-to-analog converters;

a plurality of optical devices for producing a set of laser beams;

first and second rotating mirrors for reflecting the set of laser beams and generate an image for viewing; and a mirror rotation synchronization circuit for synchronizing rotation of the first and second rotating mirrors with the outputs of the lasers.

2. The image projection system recited in claim 1 wherein the optical devices comprise color sensitive half-silvered mirrors.

3. The image projection system recited in claim 1 wherein the optical devices comprise sets of prisms having color-sensitive coatings on their respective faces.

4. The image projection system recited in claim 1 further comprising a projection screen onto which the image is projected.

5. The image projection system recited in claim 1 wherein the synchronization circuit synchronously rotates the mirrors using an image scan rate that centers the image side to side and vertically on the screen.

6. The image projection system recited in claim 1 further comprising a second set of lasers disposed at an angle with respect to the first set of lasers that project the same pixels generated by the first set of lasers ahead of the first set to double the apparent intensity of the projected image.

7. The image projection system recited in claim 1 further comprising an array of lasers for each of the colors that are independently amplitude modulated to increase the intensity of the projected image.

* * * * *